United States Patent
Farone

(10) Patent No.: US 6,644,301 B2
(45) Date of Patent: Nov. 11, 2003

(54) ICE MELTER

(76) Inventor: E. Richard Farone, 12085 Mantawauka, Fenton, MI (US) 48430

( * ) Notice: Subject to any disclaimer, the term of this patent is extended or adjusted under 35 U.S.C. 154(b) by 0 days.

(21) Appl. No.: 10/225,999

(22) Filed: Aug. 22, 2002

(65) Prior Publication Data

US 2002/0195098 A1 Dec. 26, 2002

Related U.S. Application Data

(60) Division of application No. 09/628,886, filed on Jul. 31, 2000, now Pat. No. 6,439,224, which is a continuation-in-part of application No. 09/415,659, filed on Oct. 12, 1999, now abandoned.

(51) Int. Cl.[7] .................................................. F23L 9/00
(52) U.S. Cl. ........................ 126/271.1; 126/271.2 R; 126/360.1
(58) Field of Search ..................... 126/271.1, 271.2 R, 126/360.1, 271.3, 91 A, 367.1, 369; 431/345; 175/18

(56) References Cited

U.S. PATENT DOCUMENTS

| | | | |
|---|---|---|---|
| 651,111 A * | 6/1900 | Giordan | 126/360.1 |
| 2,220,582 A | 11/1940 | Ruckstahl | 126/91 |
| 2,990,829 A | 7/1961 | McDonough et al. | 126/271.2 |
| 3,319,709 A | 5/1967 | Strunk | 165/86 |
| 3,407,283 A | 10/1968 | Peterson | 219/317 |
| 3,563,227 A | 2/1971 | Ruter | 126/271.1 |
| 3,680,645 A | 8/1972 | Horbach, deceased et al. | 175/16 |
| 3,749,184 A | 7/1973 | Andeen | 175/18 |
| 3,813,891 A | 6/1974 | Wootten | 62/56 |
| 4,006,732 A | 2/1977 | Schumm | 126/271.1 |
| 4,016,670 A | 4/1977 | Pihlaja et al. | 43/17 |
| 4,114,304 A | 9/1978 | Hedlund | 43/4 |
| 4,276,017 A | 6/1981 | Julien | 431/344 |
| 4,294,030 A | 10/1981 | Stewart | 43/4 |
| 4,438,757 A | 3/1984 | Anderson | 126/360 R |
| 4,458,608 A | 7/1984 | duBrucq | 111/3 |
| 4,539,750 A | 9/1985 | Jarvi et al. | 30/300 |
| 4,565,024 A | 1/1986 | Maerz | 43/17 |
| 4,612,910 A | 9/1986 | Williams | 126/360 R |
| 4,612,911 A | 9/1986 | Onodera | 126/369 |
| 4,651,834 A | 3/1987 | Eninger et al. | 175/18 |
| 4,699,222 A | 10/1987 | Taylor | 175/18 |
| 4,739,747 A | 4/1988 | Johnson | 126/271.1 |
| 4,845,875 A | 7/1989 | Norwick | 43/4 |
| 4,911,141 A | 3/1990 | Manuel | 126/271.1 |
| 4,945,668 A | 8/1990 | Keller | 43/17 |
| 5,016,610 A | 5/1991 | Meguro et al. | 126/91 A |
| 5,022,471 A | 6/1991 | Maurer et al. | 175/75 |
| 5,484,027 A | 1/1996 | Greenlaw et al. | 175/18 |
| 5,667,712 A | 9/1997 | Sutorius et al. | 219/535 |
| 5,844,210 A | 12/1998 | Dowdle | 219/523 |

\* cited by examiner

*Primary Examiner*—James C. Yeung
(74) *Attorney, Agent, or Firm*—Gifford, Krass, Groh, Sprinkle, Anderson & Citkowski, P.C.

(57) ABSTRACT

Ice melting apparatus having an elongated vertically disposed body member with a melting head at the lower end which is heated by a flame to melt the ice. The heat is concentrated near or within the melting head and exhaust gases are expelled through an exhaust passage. The generated heat melts a hole in the ice conforming generally to the configuration of the melting head which in most cases is circular.

9 Claims, 6 Drawing Sheets

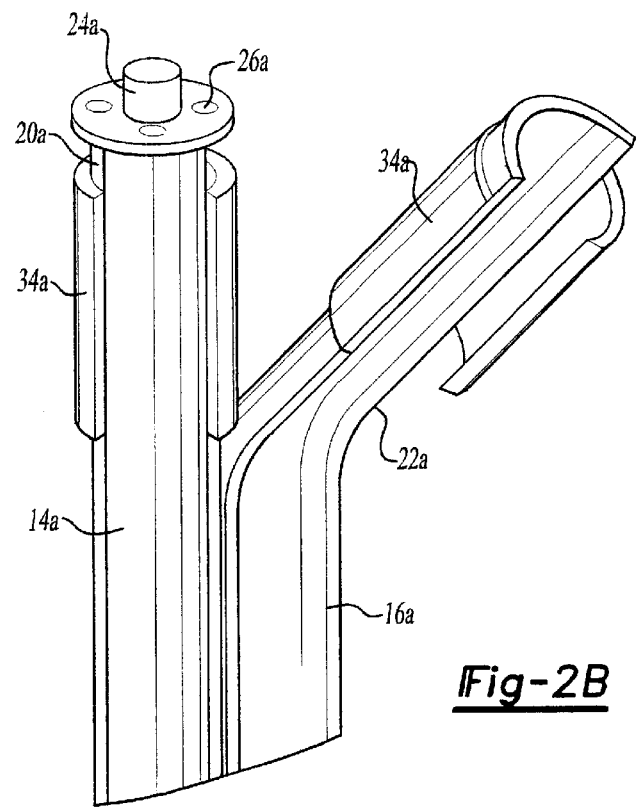
Fig-2B
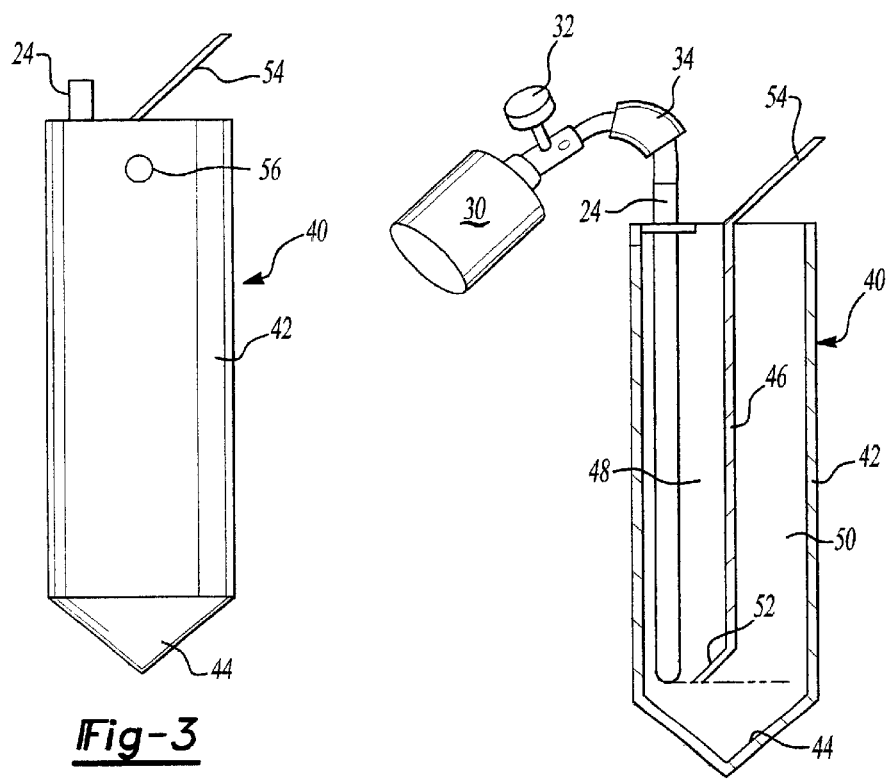
Fig-3
Fig-4

ICE MELTER

CROSS REFERENCE TO RELATED APPLICATIONS

This patent application is a divisional application of patent application Ser. No. 09/628,886, filed Jul. 31, 2000, now U.S. Pat. No. 6,439,224, which is a continuation-in-part of patent application Ser. No. 09/415,659 filed Oct. 12, 1999, abandoned.

FIELD OF THE INVENTION

This invention relates to apparatus for forming a hole in ice and more particularly for such apparatus to be used by ice fisherman for forming and maintaining a hole in the ice covering a body of water.

BACKGROUND OF THE INVENTION

One of the unpleasant problems confronting an ice fisherman is the formation of a hole in the ice which can be difficult to accomplish particularly when the ice is thick. The use of hand implements such as axes, chisels, augers, and ice drills not only requires a great amount of physical exertion, but rarely result in satisfactory openings. Power augers require physical exertion in starting and operation, can be dangerous to operate and contribute to the pollution of the water and air. All such tools require regular maintenance in order to keep the blades sharp. Additionally, all of these ice cutting methods are undesirable because of the resultant particles or ice swarf that is deposited in and around the hole that is formed.

There is a need for an apparatus to form a hole in the ice with a minimum of effort, pollution and without the formation of particles of ice in and around the hole.

SUMMARY OF THE INVENTION

It is an object of the invention to provide an apparatus for forming holes in the ice in which the apparatus is easily transported and operated.

Another object of the invention is to provide apparatus for forming holes in ice by melting the ice through the use of heat in the form of a flame.

Still another object of the invention is to provide an apparatus for melting a hole in the ice which uses apparatus having a heating source utilizing a commonly available source of fuel.

The objects of the invention are attained by an ice melting apparatus that has a body member which is held vertically with a lower end or melting head placed in contact with the top surface of a layer of ice. The lower end of the body member is heated to melt through the ice by way of a fuel and air passage which extends longitudinally of the body member with a gas burner that is preferably at or near the lower end or in the ice melting head so that flames are formed near where the heat is desired. Exhaust gases are directed upwardly through an exhaust passage and then outwardly away from the operator. In a first embodiment of the invention the melting head is generally annular and melts the ice on the perimeter of the hole leaving some ice in the center which can be removed easily. In a further embodiment the melting head presents a continuous, nonannular surface which melts the ice completely in the desired hole. The shape of the ice melting surface can be conical, spherical, elliptical, flat, or any other applicable shape, and additionally may have grooves, fins or a projecting tip portion. Internal devices such as baffles and heat sinks can be used in the ice melting head to increase efficiency. In additional embodiments the apparatus is disclose as including: a combination fuel/air supply line, a flame ignition system; at least one arm to prevent the apparatus from falling through the hole formed in the ice; at least one handle for grasping the apparatus; and, waterproof thermal insulation.

BRIEF DESCRIPTION OF THE DRAWING

FIG. 3 is a front elevation of another embodiment of the invention;

FIG. 4 is a cross-sectional view taken longitudinally of the structure in FIG. 3;

DETAILED DESCRIPTION OF THE PREFERRED EMBODIMENTS

Figure 1:
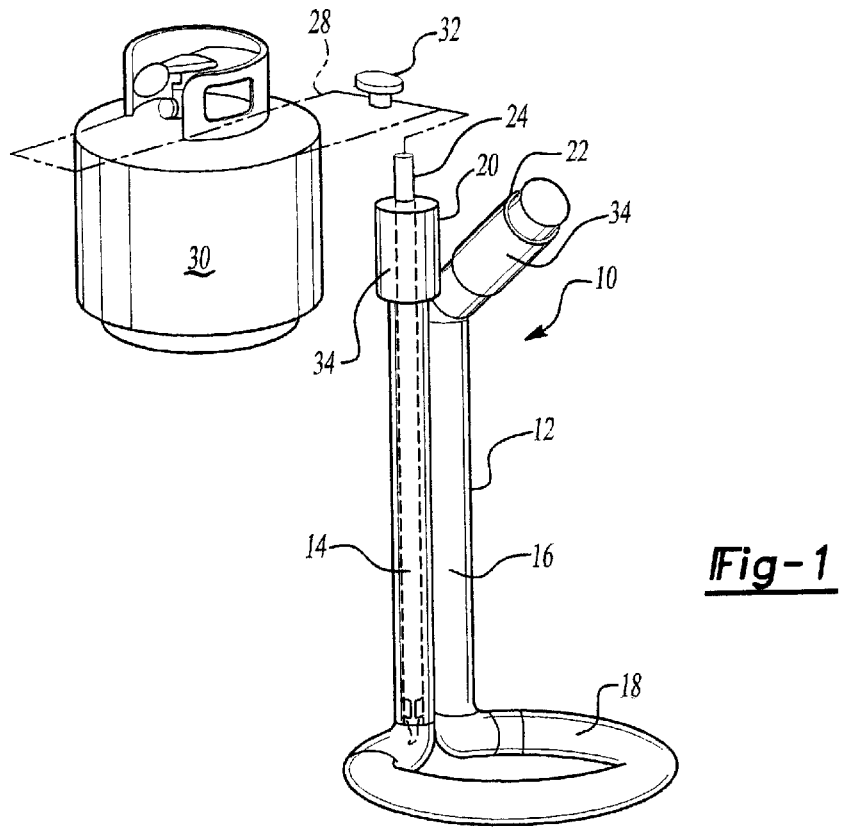
FIG. 1 is a perspective view of a preferred embodiment of the invention shown together with a fuel supply.

Referring to FIG. 1, a preferred embodiment of the invention is designated generally at 10 and includes an elongated body member 12 formed by a pair of generally parallel tubes 14 and 16. The body member 12 is disposed generally vertically and the lower end of the tubes 14 and 16 are connected to a melting head 18 having a substantially annular configuration extending in a horizontal plane to one side of the lower end of the body member 12. Preferably, the melting head is circular, however, it is understood that it may be constructed in a variety of configurations including: flat, oval and rectangular. Thus, while a circular shaped ice hole is preferred, other designs may also be melted though the ice based upon the shape of the melting head.

The tubes 14 and 16 and melting head 18 form a continuous passage extending from the upper end 20 of tube 14 which acts as a supply passage, through the annular melting head 18 and through the exhaust tube 16 which acts as an exhaust passage. An upper end 22 of tube 16 is bent outwardly to divert exhaust gases away from the operator. Though the preferred embodiment of the present invention has two tubes 14 and 16, it will be apparent from this disclosure to those skilled in the art, that one tube may be used, or a multitude of tubes connected by means well known in the art may be used for this purpose. In such an embodiment, the connection means must also be resistant to temperature changes and leakproof when submerged in water.

It will also be apparent to those skilled in the art from this disclosure, that tubing of various cross-sectional shapes may be used. The efficiency and strength of the present invention could be altered by the variation of the cross-sectional shape and size of these tubes.

Preferably, the tubes 14 and 16 and the melting head 18 are formed of heat resistant metal such as stainless steel, steel, copper, aluminum or brass. Any and all joints should be heat resistant and leakproof when submerged in water.

The lower end 20 of tube 14 is provided with a gas burner or torch 24 which is mounted axially of the lower end of tube 14. The upper end of torch 24 is connected by a flexible hose indicated at 28 to a fuel supply tank 30. Alternatively, the hose may be a rigid pipe such as a copper tube. The fuel can be of a type commonly available and used in other applications and accessories commonly used by ice fisherman such as torches, lanterns, stoves and heaters. Among such fuels are propane, butane, LPG, acetylene, pressurized white gasoline, ethylene or any volatile hydrocarbon.

The apparatus is used by igniting the torch 24 which is under the control of a valve 32 disposed between the fuel supply tank 30 and the torch 24. The air and fuel can arrive at the torch 24 separately or mixed and is ignited near the bottom of the tube 14 and near or in the melting head. The touch can be ignited while inside the tube 14 or outside the tube 14 followed by insertion into tube 14. The ignited air and fuel in tube 14 is directed sidewardly through the annular melting head 18. The flame heats the head 18 which rests on the ice. The upper end of apparatus 10 is guided manually by the use of heat insulated handles 34 formed on the upper ends 20 of tube 14 and on exhaust extension 22 on the upper end of tube 16.

The heating of head 18 continues with exhaust gases passing through the tube 16 and the exhaust extension 22. If desired the exhaust gases can be diverted to heat other devices or enclosures.

In use, the burner 24 is adjusted to emit fuel which is ignited to create a flame to heat the melting head 18. The melting head 18 is placed in a selected location on the ice. The hot melting head tends to melt the ice and to form a hole having a shape conforming to the outer configuration of the melting head 18.

Figure 2A:
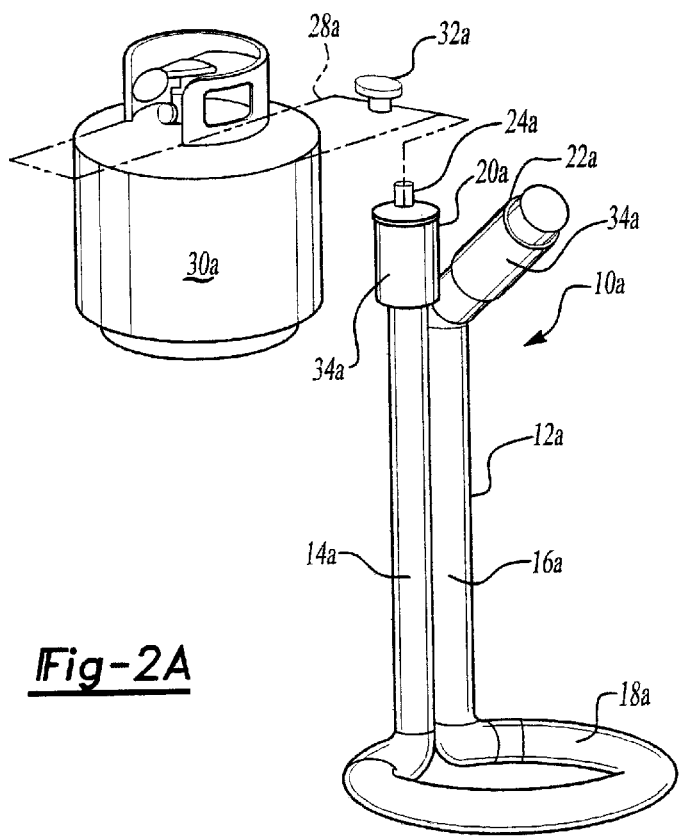
FIG. 2 is a longitudinal cross-section of the upper portion of the ice melting apparatus shown in FIG. 1.

Referring to FIGS. 2A and 2B, a further embodiment of the invention is designated generally at 10a and includes an elongated body member 12a formed by a pair of generally parallel tubes 14a and 16a. The body member 12a is disposed generally vertically and the lower end of the tubes 14a and 16a are connected to a melting head 18a having a substantially annular configuration extending in a horizontal plane to one side of the lower end of the body member 12a. This embodiment is similar to that shown in FIG. 1 with the exception that it is upper end 21a, rather than the lower end 20, of tube 14a that includes a gas burner or torch 24. In operation, the ignited air and fuel in the heating passage or supply tube 14 is directed downwardly through the tube and into the annular melting head 18.

As seen in FIGS. 3–11 the shape of the melting head can conical, elliptical, hemispherical, truncated, conical, flat, or essentially any other applicable shape. A projecting tip, grooves or fins may also be provided on the melting head to more efficiently heat and melt the ice. Additionally, the melting head may have baffles or heat sinks to improve the overall efficiency of the present invention. As will be shown, supplies of fuel and air may be combined into a single line or remain separate prior to combustion. Igniters such as piezoelectric or battery generated sparks, pilot lights or catalytic elements may also be used whether the torch is ignited inside or outside the apparatus. The ignited fuel can be of a type commonly available and used in other applications and accessories commonly used by ice fisherman such as torches, lanterns, stoves and heaters. Again, among such fuels are propane, butane, LPG, acetylene and pressurized white gasoline, ethylene or any volatile hydrocarbon. Preferably, these embodiments are also constructed of heat-resistant metal such as stainless steel, steel, copper, aluminum or brass. Furthermore, all joints should be heat resistant and leakproof when submerged in water. The resultant hole is free of ice particles and is easily maintained in an ice free condition by repeating the heating and melting process when needed. Each of these advancements may be used alone or in combination with the various embodiments of the present invention.

Another embodiment of the invention as shown in FIGS. 3 and 4 in which the ice melting apparatus 40 has a cylindrical body member or housing 42 closed at its lower end by a conical melting head 44. The interior of the cylindrical housing 42 is provided with a longitudinally extending baffle 46 which extends for substantially the full length of the housing and divides the interior into a fuel and air supply passage 48 and an exhaust passage 50. The baffle 46 has a lower end portion 52 which is bent to one side to divert fuel and air flow at the lower end of passage 48 such that the flame tends to begin at this point and is concentrated at the melting head 44. The upper end of the baffle 46 is provided with an end portion 54 the is bent opposite to the lower end 52 and diverts exhaust gases away from the upper end of the cylinder 42 and from the operator of the apparatus.

A torch or burner 24 of the same type as that used with the embodiment shown in FIG. 1 can be mounted at the upper end of cylinder 42 in the entrance to passage 48, the torch can be connected to a source of fuel as shown in FIG. 1. Insulated handles 56 may be provided at the upper end of the body member 42 to assist in maintaining the device 40 in a vertical position.

In use, the housing 42 is held vertically and the melting head 44 is placed in a selected location with the apex of the cone shaped head 44 on the ice. After the flame is formed to heat the melting head 44, the ice is melted and a hole is formed having a circular configuration generally conforming to the cylindrical housing 42.

Figure 5:
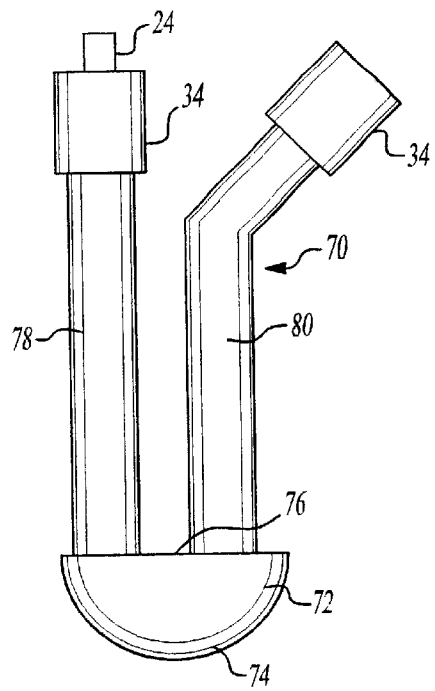
FIG. 5 is an elevation of still another embodiment of the invention.
Figure 6:
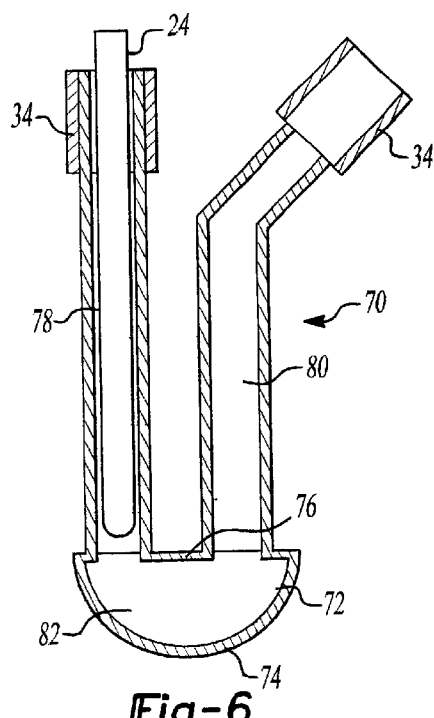
FIG. 6 is a cross-sectional view taken longitudinally of the structure in FIG. 5.

Another embodiment of the invention is shown in FIG. 5 and FIG. 6 in which the ice melting apparatus 70 includes a melting head 72. The melting head has a semi-spherical lower wall 74 for contacting the ice. Preferably, the upper portion of the semi-sphere is closed by a flat, horizontal wall 76. A first tube forms a fuel and air supply passage 78. A second tube forms an exhaust passage 80 extending generally parallel to each other. The lower ends of the tubes are rigidly connected to wall 76 to communicate with the chamber 82 formed in the interior of the melting head 72. The tubes forming the passages 78 and 80 form a body member which extends generally vertically during use.

The fuel and air passage 78 can be provided with a burner 24 in the same manner as shown in FIG. 1. Insulated handles 34 can also be provided in the same manner as in the version shown in FIG. 1.

In use, the apparatus 70 is supported vertically with the lower wall 74 resting on the ice. The fuel is ignited and the resultant flame is concentrated to heat the melting head 72. As the ice is heated and melted, the apparatus 70 moves downwardly to form a hole having a generally round configuration conforming to the shape of the upper portion of the melting head 72.

Figure 7:
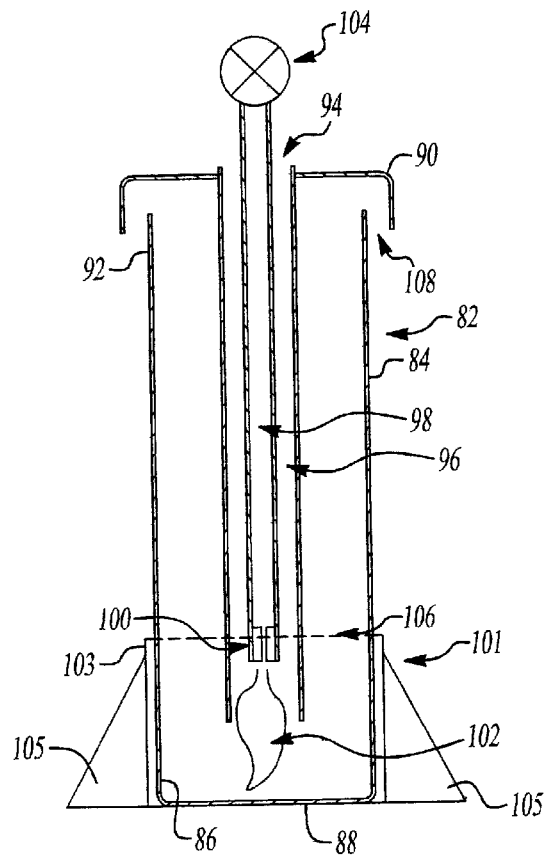
FIG. 7 is a cross-sectional view of still another embodiment of the invention showing a concentric arrangement of a fuel supply tube within an air supply tube.

Another embodiment of the invention is shown in FIG. 7, in which the ice melting apparatus 82 has a cylindrical body member or housing 84 that is closed at its lower end 86 by a substantially planer melting head 88. A top cap 90 is preferably removably affixed to the upper end 92 of the housing 84 and defines a central air intake opening 94. Alternatively, the top cap 90 may be constructed as part of the housing or otherwise permanently fixed to the housing 84. Preferably, a tube that serves as an air passage 96 extends longitudinally downward from the opening 94 for substantially the full length of the housing 84. A tubular fuel supply line 98 having a diameter less than that of the opening 94 and air passage 96 extends downwardly into the air passage and includes a fuel nozzle 100 at its lower end. Preferably, the fuel line 98 is a rigid metal tube and is removably mounted to the air passage 96. However, it is expected that flexible tubing may also be used or that the line 98 may be mounted to the cap 90.

In use, the apparatus 82 is held vertically and the melting head 88 is placed in a selected location on the ice. Alternatively, a holder 101 may be adapted to secure the apparatus 82 in a substantially vertical position on the ice. Preferably, the holder 101 comprises a cylinder 103 have a flange 105, or alternatively a plurality of legs, radially mounted to its base. In operation, the apparatus 82 is placed in an upright position within the cylinder and permitted to melt through the ice surface. Handles, top cab 90 or similar objects project from the apparatus 82 acts to prevent submersion of the apparatus below the surface of the ice. It is anticipated that the holder 101 may be constructed of various shapes (i.e., square, rectangular, oval, etc.) and adapted for use with any of the embodiments of the present invention. The holder 101 has the advantage of permitting the user to perform other tasks while a hole is melted through the ice.

After a flame 102 is formed to heat the melting head, the ice is melted and a hole is formed having a circular configuration generally conforming to the cylindrical housing. The flame 102 is under the control of a valve 104 disposed between a fuel supply tank and the flame 102. Exhaust from the flame 102 circulates upwardly through the exhaust passage 106 that concentrically surrounds the air passage 96 and exits the housing through at least one exhaust vent 108 defined by the upper end of the housing 84 and the top portion 90.

Figure 8:
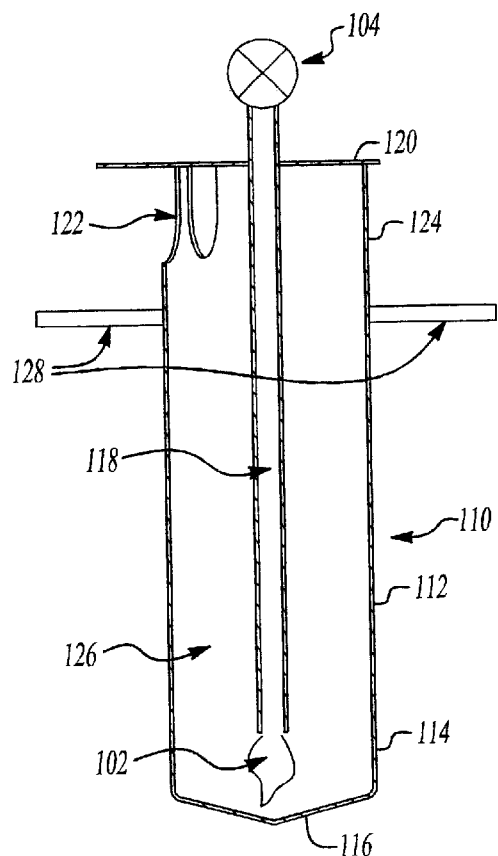
FIG. 8. is a cross-sectional view of still another embodiment of the invention showing exhaust ports and means of preventing the apparatus from falling through the ice.

Another embodiment of the invention is shown in FIG. 8, in which the ice melting apparatus 110 has a cylindrical body member or housing 112 that is closed at the lower end 114 by a conical melting head 116. A combined fuel and air passage 118 is mounted to the housing 112 through a top portion 120. The passage 118 extends downwardly from the top portion 120 for substantially the full length of the housing 112. At least one exhaust port 122 is defined in the upper end 124 of the housing 112 to transmit hot exhaust from the exhaust passage 126. Preferably, at least one arm 128, such as a disc extending radially outwardly from the housing 112, is affixed to the exterior of the housing 112 to prevent the apparatus from falling through the hole that is melted into the ice. Alternatively, at least one or a plurality of arms may extend outwardly from the exterior of the housing 112. Preferably, the arms are disposed below the exhaust port 122 to prevent water from entering the interior of the housing 112.

Figure 9:
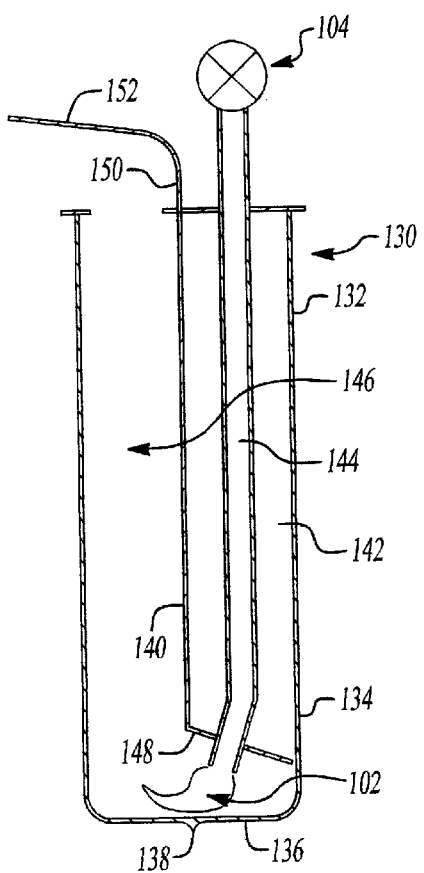
FIG. 9. is a cross-sectional view of still another embodiment of the invention.

Another embodiment of the invention is shown in FIG. 9, in which the ice melting apparatus 130 has a cylindrical body member or housing 132 that is closed at its lower end 134 by a substantially planar melting head 136. Alternatively, the melting head may be provided with a tip portion 138 that assists in positioning the apparatus 130 on the ice.

The interior of the cylindrical housing 132 is provided with a longitudinally extending baffle 140 which extends for substantially the full length of the cylinder and divides the latter into a supply passage 142, including a combined fuel and air passage 144 and an exhaust passage 146. The baffle 140 has a lower end portion 148 which is bent to one side. The passage 144 extends through the end 148 so that the flame from the burner is concentrated at the melting head 136. The upper end 150 of the baffle 140 is provided with an end portion 152 bent opposite to end 148 to divert exhaust gases away from the upper end of the cylinder 42 and from the operator of the apparatus.

Figure 10:
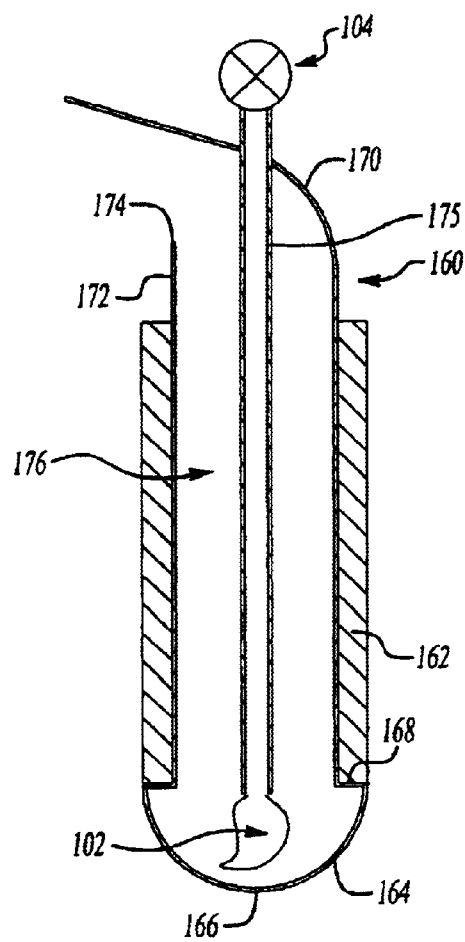
FIG. 10. is a cross-sectional view of still another embodiment of the invention showing waterproof insulation mounted on the side of the apparatus; and, FIG. 11. is a cross-sectional view of still another embodiment of the invention showing the use of an igniter for the torch.

Another embodiment of the invention is shown in FIG. 10, in which the ice melting apparatus 160 has a cylindrical body member or housing 162 that includes a melting head 164. The melting head has a semi-spherical lower wall 166 for contacting the ice. The upper portion of the semi-spherical wall is enclosed by a flat horizontal wall 168. A side 170 of the upper end 172 of the housing 160 extends and is bent toward the opposite wall 174 to divert exhaust gases away from the operator of the apparatus 160. A fuel air supply tube 176 is mounted through the bent portion of the side 170 and extends downwardly through the interior of the housing 160 for substantially the full length of the cylinder. Preferably, waterproof insulation 162 is disposed on the sides of the apparatus to minimize heat from the flame from being transmitted through the walls of the housing 160. This insulation has the benefit of imparting a more cylindrical shape to the hole as it is formed in the ice.

Figure 11:
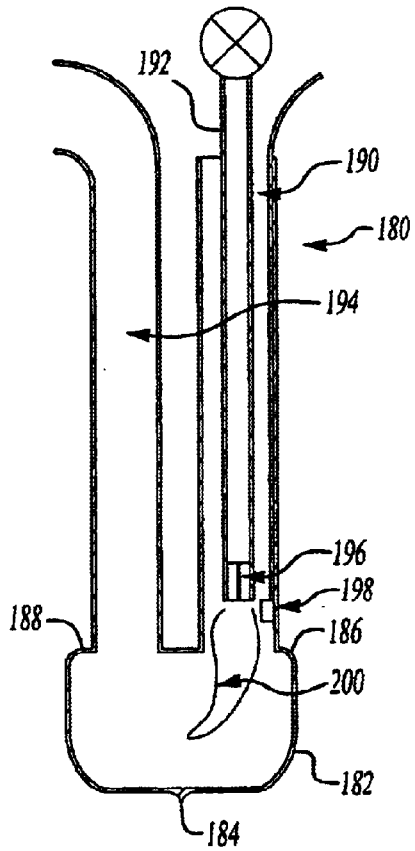

Another embodiment of the invention is shown in FIG. 11 in which the apparatus 180 includes a melting head 182. The melting head 182 has a substantially planar surface that includes a tip portion 184 to assist in positioning the apparatus 180 on the ice. The upper portion 186 of the melting head 182 is closed by a flat, horizontal wall 188. A tube forms air supply passage 190. A fuel supply line 192 having a diameter less than that of the air passage 190 extends downwardly through the passage 190 and includes a fuel nozzle 196. Another tube forms an exhaust passage 194 that extends upwardly from the melting head 182 and generally parallels the air passage 190. The air and exhaust passages 190, 194, in combination with the melting head 182, form a body member which extends generally vertically during use.

In use, the apparatus 180 is supported vertically with the planar surface resting on the ice. A fuel ignition system, such as piezoelectric or battery generated sparks, pilot lights or catalytic elements, is disposed in the air passage 190 proximate the end of the fuel supply line 194 to ignite the fuel and create a flame 102. Once the fuel is ignited, the resultant flame is concentrated to heat the melting head 182. As the ice is heated and melted, the apparatus 180 moves downwardly to form a hole having a generally round configuration conforming to the shape of the upper portion of the melting head 182.

Apparatus for forming a hole in ice by melting has been provided in which a gas-fueled flame is used to heat a melting head placed in contact with the ice to form a hole conforming to the shape of the melting head which generally is circular. The hole formed is free of swarf and it is formed without the need for physical strength on the part of the operator. Though not illustrated in the accompanying figures, handles may be provided to make the use of the present invention more comfortable.

Figure 12:
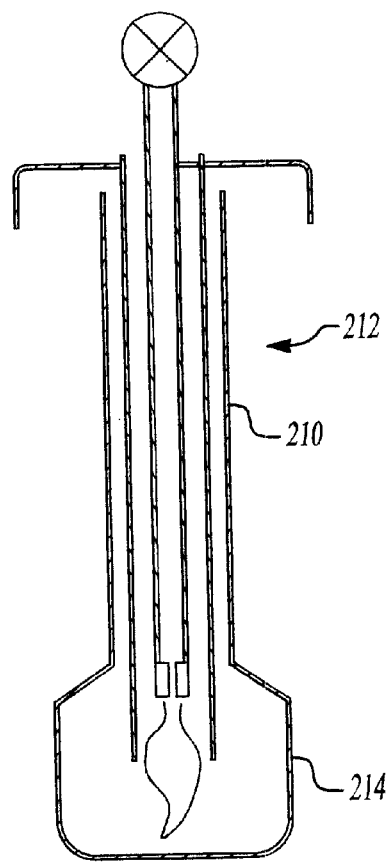
FIG. 12. is a cross-sectional view of still another embodiment of the invention showing a reduced exhaust area.

Referring now to FIG. 12 there is shown a further embodiment of the present invention wherein the walls 210 of the housing 212 extend inwardly from the melting head 214. This arrangement has the advantage of restricting exhaust flow and tapping additional heat in the melting head 214. A further advantage of this embodiment is that the reduced area of the housing decreases the buoyancy of the housing 212 and permits the apparatus to remain on the ice surface (instead of floating on the melted water) as the ice is melted.

Figure 13:
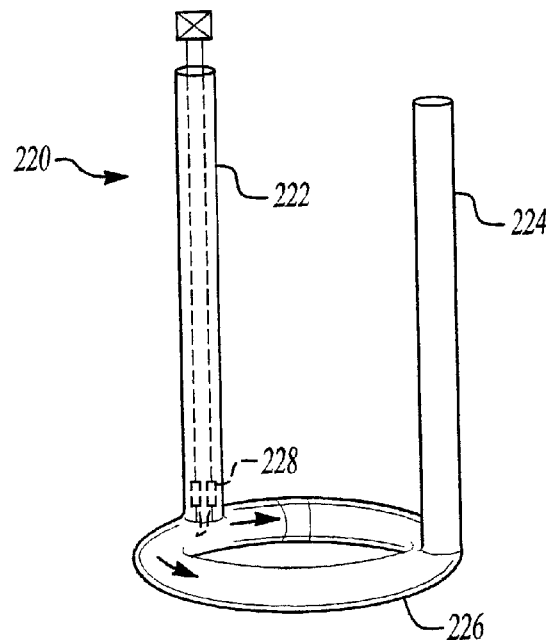
FIG. 13 is a cross-sectional view of still another embodiment of the invention showing a t-shaped burner.

Referring now to FIG. 13 there is shown a further embodiment of the present invention including an elongated body member 220 formed by a pair of generally parallel tubes 222 and 224. The body member 220 is disposed generally vertically and the lower end of the tubes 222 and 224 are connected at diametrically opposed points to a melting head 226 having a substantially annular configuration extending in a horizontal plane to one side of the lower end of the body member 12. A burner 228 is mounted at the lower end of the tube 222 such that burning fuel is directed in both to the left and right around the two halves of the melting head 226 to reach the tube 224. The exhaust from the burner then exits the body member 220 via tube 224. Alternatively, a second burner may be disposed in the tube 224 and a plurality of exhaust tubes may be configured to extend upwardly from the melting head 226.

Having described my invention, however, many modifications thereto will become apparent to those skilled in the art to which it pertains without deviation from the spirit of the invention. For example, it will be obvious to those skilled in the art to surround the device of the present invention, or parts thereof, with insulation to prevent heat loss and thus make the present invention more efficient.

What is claimed is:

1. An apparatus for forming an opening in ice covering a body of water, comprising:
   a body member adapted to be supported in a vertical position, said body member including a melting head, a supply passage and an exhaust passage that is apart from said supply passage, said melting head having an interior chamber, said supply passage being secured to said melting head and adapted to communicate with said interior chamber, said exhaust passage being secured to and extending away from said melting head and being adapted to communicate with said interior chamber; and
   a burner positioned within said supply passage, said burner generating heated gas that is communicated from said supply passage into said interior chamber and away from said interior chamber through said exhaust passage, said melting head concentrating said heat gas from said burner.

2. The apparatus of claim 1, wherein an upper portion of said exhaust passage extends radially outward.

3. The apparatus of claim 2 wherein heat resistant handles are formed on said supply passage and said exhaust passage.

4. The apparatus of claim 1 wherein heat resistant handles are formed on said supply passage and said exhaust passage.

5. The apparatus of claim 1 wherein said melting head has a configuration conforming to the size of the opening to be formed in the ice.

6. The apparatus of claim 1 wherein said melting head has a semi-spherical wall for contacting the ice.

7. The apparatus of claim 1 wherein said supply passage and said exhaust passage are positioned at opposing points of said lower end.

8. An apparatus for forming an opening in ice covering a body of water, comprising:
   a body member adapted to be supported in a vertical position, said body member including a melting head, a supply passage and an exhaust passage that is apart from said supply passage, said supply passage and exhaust passage having heat resistant handles, said melting head having an interior chamber, said supply passage being secured to said melting head and adapted to communicate with said interior chamber, said exhaust passage being secured to and extending away from said melting head with at least a portion of said exhaust passage being parallel to said supply passage, having an upper portion that extends radially outward and being adapted to communicate with said interior chamber; and
   a burner positioned within said supply passage, said burner generating heated gas that is communicated from said supply passage into said interior chamber and away from said interior chamber through said exhaust passage, said melting head concentrating heated gas from said burner.

9. An apparatus for forming an opening in ice covering a body of water, comprising:
   a body member adapted to be supported in a vertical position, said body member including a melting head, a supply passage and an exhaust passage that is spaced apart from said supply passage, said melting head having an interior chamber and having a configuration conforming to the size of the opening to be formed in the ice, said supply passage being secured to said melting head and adapted to communicate with said interior chamber, said exhaust passage being secured to and extending away from said melting head and adapted to communicate with said interior chamber and a portion of said exhaust passage being parallel to said supply passage; and
   a burner positioned within said supply passage, said burner generating heated gas that is communicated from said supply passage into said interior chamber and away from said interior chamber through said exhaust passage, said melting head concentrating said heat gas from said burner.

* * * * *